(12) United States Patent
Miyake

(10) Patent No.: US 10,613,530 B2
(45) Date of Patent: Apr. 7, 2020

(54) AUTONOMOUS TRAVELLING APPARATUS, AUTONOMOUS TRAVEL CONTROL METHOD, AND CONTROL PROGRAM

(71) Applicant: Sharp Kabushiki Kaisha, Sakai, Osaka (JP)

(72) Inventor: Kohji Miyake, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 59 days.

(21) Appl. No.: 15/666,599

(22) Filed: Aug. 2, 2017

(65) Prior Publication Data

US 2018/0039267 A1 Feb. 8, 2018

(30) Foreign Application Priority Data

Aug. 8, 2016 (JP) .................................. 2016-155830

(51) Int. Cl.
| | |
|---|---|
| *G05D 1/00* | (2006.01) |
| *G05D 1/02* | (2020.01) |
| *B60T 7/12* | (2006.01) |
| *B60W 30/14* | (2006.01) |

(52) U.S. Cl.
CPC .............. *G05D 1/0055* (2013.01); *B60T 7/12* (2013.01); *B60W 30/146* (2013.01); *G05D 1/0214* (2013.01); *G05D 1/0223* (2013.01); *G05D 1/0238* (2013.01); *G05D 2201/0207* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 2006/0092073 | A1* | 5/2006 | Boecker | G01S 13/931 342/70 |
| 2013/0226344 | A1* | 8/2013 | Wong | G05D 1/024 700/258 |
| 2016/0236682 | A1* | 8/2016 | Takada | B60W 30/09 |
| 2017/0162056 | A1* | 6/2017 | Feyerabend | B60Q 9/008 |
| 2017/0225336 | A1* | 8/2017 | Deyle | B25J 13/086 |
| 2018/0052457 | A1* | 2/2018 | Kim | H04N 13/296 |
| 2018/0057003 | A1* | 3/2018 | Hyun | B60W 40/06 |
| 2018/0307236 | A1* | 10/2018 | Reed | G05D 1/0223 |

FOREIGN PATENT DOCUMENTS

| | | |
|---|---|---|
| CN | 205273395 U | 6/2016 |
| JP | 2011-194979 A | 10/2011 |

* cited by examiner

*Primary Examiner* — Christian Chace
*Assistant Examiner* — Kyung J Kim
(74) *Attorney, Agent, or Firm* — Keating & Bennett, LLP

(57) ABSTRACT

An autonomous travelling vehicle that autonomously travels based on surrounding information includes an information processing unit that processes surrounding information obtained, a control unit that controls driving of the autonomous travelling vehicle based on the surrounding information, a surrounding information acquisition sensor that obtains surrounding information for the travelling direction of the car body, and a blind area determining unit that determines a blind area around the car body not covered by the surrounding information acquisition sensor. When the autonomous travelling vehicle travels in a blind area at the start of travel, the control unit controls the autonomous travelling vehicle so as to travel at a speed lower than a preset normal speed.

19 Claims, 10 Drawing Sheets

AUTONOMOUS TRAVELLING APPARATUS, AUTONOMOUS TRAVEL CONTROL METHOD, AND CONTROL PROGRAM

BACKGROUND

1. Field

The present disclosure relates to an autonomous travelling apparatus, autonomous travel control method, and control program.

2. Description of the Related Art

Known technologies for autonomous travelling apparatuses have enabled autonomous travelling of mobile objects, such as autonomous travelling vehicles, by collecting surrounding information (for example, distance measurement information) for its travelling direction and detecting any obstacle present around the mobile object based on the surrounding information.

Some autonomous travelling vehicles, or apparatuses, achieve safe driving through obstacle detection by use of a non-contact sensor (LIDAR). There are however areas around the vehicle that are not covered by the non-contact sensor, namely blind areas. In case an obstacle is present in such a blind area, the autonomous travelling vehicle might collide with the obstacle if it travels without being aware of the obstacle.

As a related art, for example, a driving assistance apparatus is proposed which provides control in assisting safe driving in relation to a blind area for a vehicle. The driving assistance apparatus includes an ambient environment recognizing unit for recognizing a surrounding environment of a vehicle, a blind spot detecting unit for detecting a blind spot from a perspective of the vehicle based on the recognized surrounding environment, a control activating unit for activating safe driving assist control for the blind spot if a first condition is met based on a result of detection by the blind spot detecting unit, and a control deactivating unit for deactivating the safe driving assist control if a second condition different from the first condition is not met based on a result of detection by the blind spot detecting unit after activating the safe driving assist control (see Japanese Unexamined Patent Application Publication No. 2011-194979).

By setting different conditions for activation and deactivation of safe driving assist control for a blind spot, the above-described driving assistance apparatus can avoid repeated activation and deactivation of safe driving assist control even when there are multiple blind spots, which can reduce the driver's frustration.

The above-described driving assistance apparatus disclosed in Japanese Unexamined Patent Application Publication No. 2011-194979 addresses a subsequent event by detecting a blind spot in the travelling direction of the vehicle; however, for an autonomous travelling vehicle in a stopped state, there can be a spot not visible to the non-contact sensor around the vehicle in its travelling direction when it starts moving. If an obstacle is present in the blind area and the autonomous travelling vehicle travels as usual without noticing it, the vehicle might collide with the obstacle, causing considerable damage to the autonomous travelling vehicle itself or the obstacle.

The present disclosure therefore provides an autonomous travelling apparatus, autonomous travel control method, and control program that assure safety against collision without considerable damage to the autonomous travelling apparatus itself or an obstacle even if an obstacle is present in a blind area when the autonomous travelling apparatus starts travelling.

SUMMARY

In the following, the autonomous travelling apparatus, autonomous travel control method, and control program according to the present disclosure will be generally set forth.

According to an aspect of the present disclosure, an autonomous travelling apparatus is provided, the autonomous travelling apparatus having a detection device to obtain surrounding information and autonomously travelling based on the surrounding information, and including: an information processing unit that processes surrounding information obtained by the detection device; a control unit that controls driving of the autonomous travelling apparatus based on the surrounding information; a travelling direction information detecting unit (an obstacle sensor) that functions as the detection device to obtain surrounding information for a travelling direction; and an undetectable area determining unit that determines a nearby undetectable area not covered by the travelling direction information detecting unit (a blind area). When the autonomous travelling apparatus travels in the undetectable area (blind area) at a start of travel, the control unit controls the autonomous travelling apparatus so as to travel at a predetermined speed lower than a preset normal speed.

According to another aspect of the present disclosure, an autonomous travel control method is provided for use with an autonomous travelling apparatus having a detection device to obtain surrounding information and autonomously travelling based on the surrounding information, the autonomous travel control method including: obtaining surrounding information for a travelling direction; processing the surrounding information obtained; controlling driving of the autonomous travelling apparatus based on the surrounding information; and determining a nearby undetectable area in which surrounding information is not obtained. When the autonomous travelling apparatus travels in the undetectable area at a start of travel, the autonomous travelling apparatus is controlled so as to travel at a predetermined speed lower than a preset normal speed.

According to still another aspect of the present disclosure, a control program is provided, a non-transitory computer-readable medium storing the control program causing operation of an autonomous travelling apparatus having a detection device to obtain surrounding information, an information processing unit to process the surrounding information obtained, and a control unit to control driving and autonomously travelling based on the surrounding information, the control program causing the detection device to function to obtain surrounding information for a travelling direction, the information processing unit to function to determine a nearby undetectable area which is not covered by the detection device, and the control unit to function to control the autonomous travelling apparatus so as to travel at a predetermined speed lower than a preset normal speed when the autonomous travelling apparatus travels in the undetectable area at a start of travel.

DESCRIPTION OF THE EMBODIMENTS

First Embodiment

Embodiments for practicing the autonomous travelling apparatus according to the present disclosure will now be described with reference to the drawings.

Figure 1:
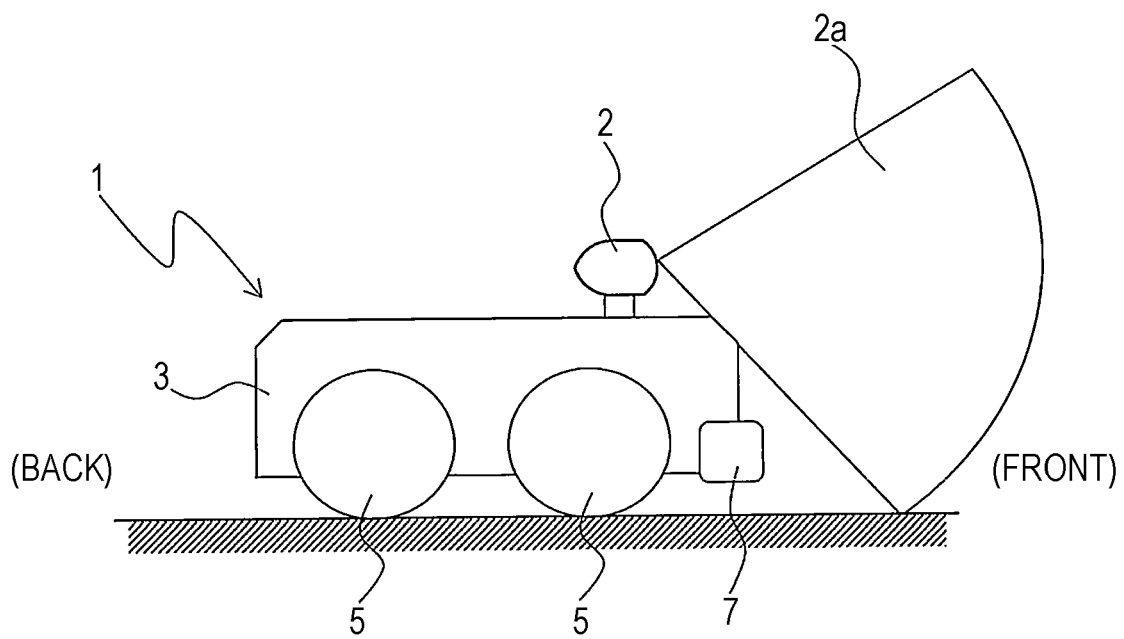
FIG. 1 illustrates an overall structure of an autonomous travelling vehicle according to a first embodiment of the present disclosure.
Figure 2:
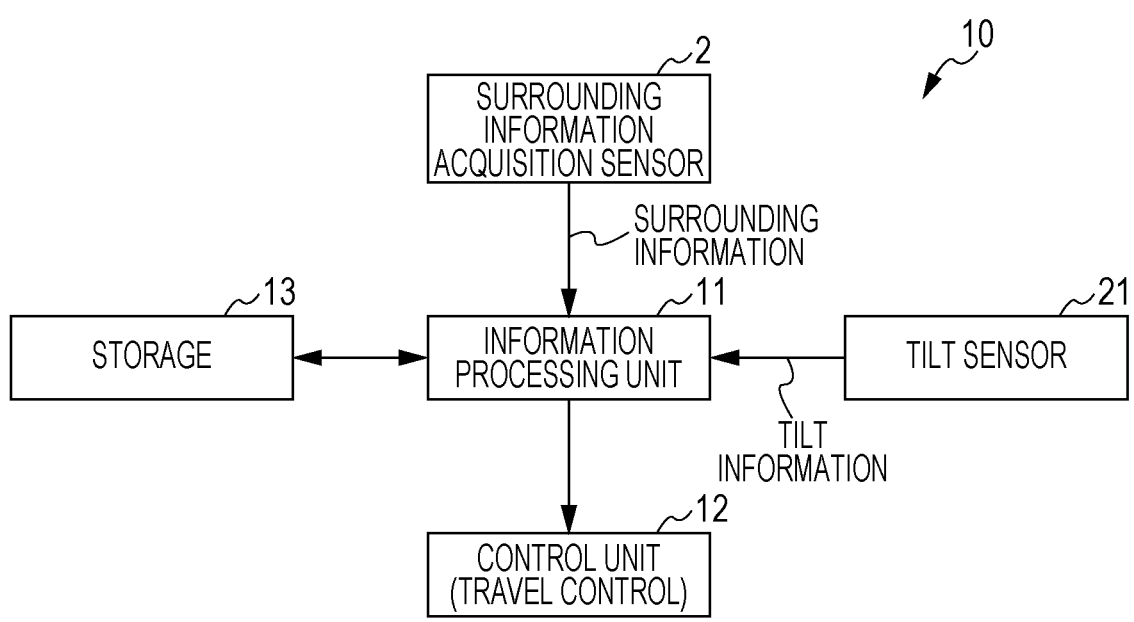
FIG. 2 is a block diagram showing an electrical configuration of an autonomous travel control system for controlling the driving of the autonomous travelling vehicle.
Figure 3:
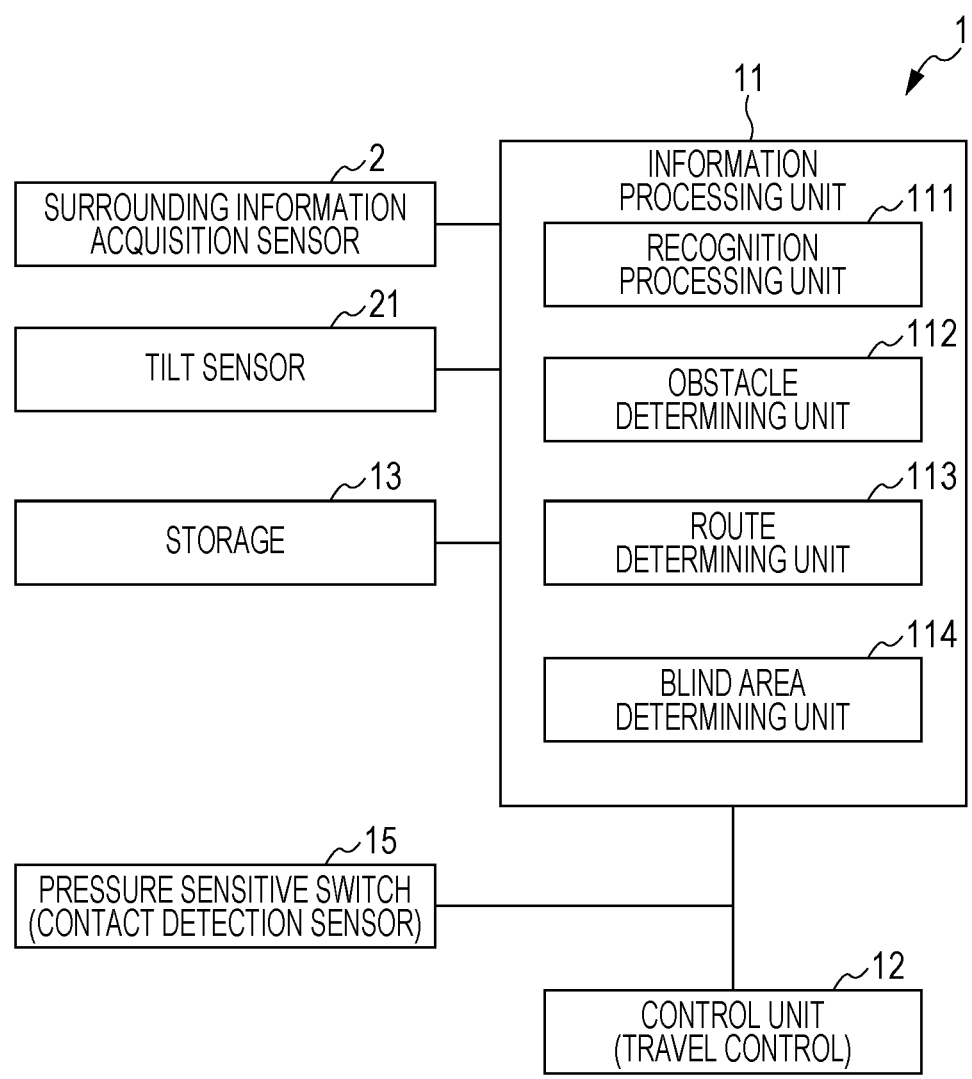
FIG. 3 is a block diagram showing a configuration of an information processing unit as a component of the autonomous travelling vehicle.
Figure 4:
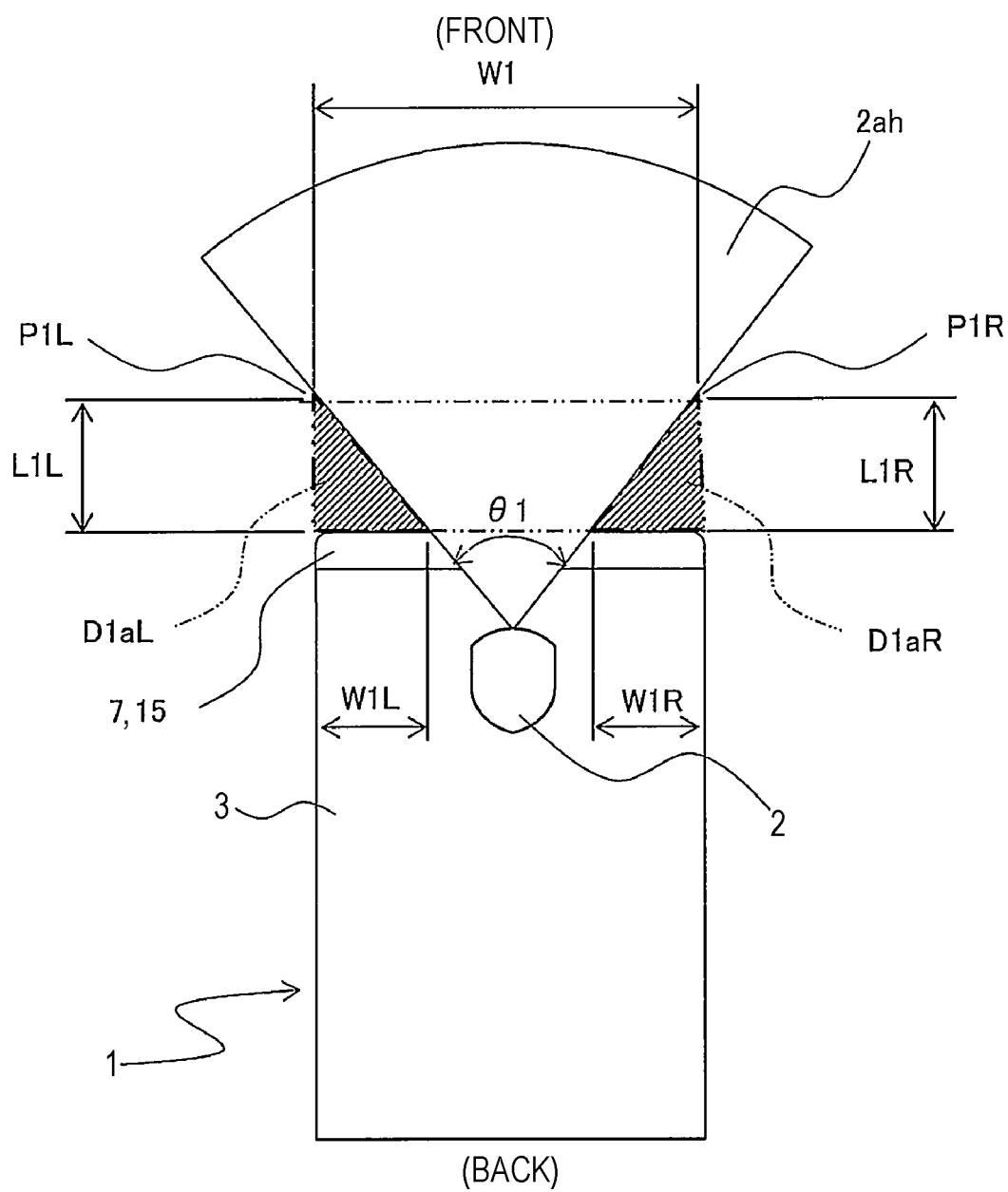
FIG. 4 is a plan view illustration of a detection area and blind areas of a surrounding information acquisition sensor for the autonomous travelling vehicle.
Figure 5:
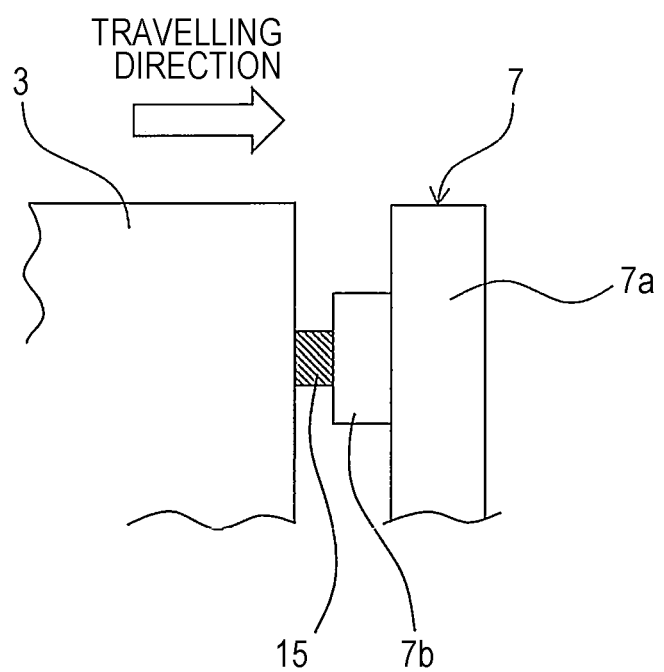
FIG. 5 illustrates the structure of a bumper as a component of the autonomous travelling vehicle.

FIG. 1 illustrates an overall structure of an autonomous travelling vehicle according to a first embodiment of the present disclosure as an exemplary form for practicing the present disclosure. FIG. 2 is a block diagram showing an electrical configuration of the autonomous travelling vehicle. FIG. 3 is a block diagram showing a configuration of an information processing unit as a component of the autonomous travelling vehicle. FIG. 4 is a plan view illustration of a detection area and blind areas of a surrounding information acquisition sensor for the autonomous travelling vehicle. FIG. 5 illustrates the structure of a bumper as a component of the autonomous travelling vehicle.

As shown in FIG. 1, an autonomous travelling vehicle 1 according to the first embodiment as an autonomous travelling apparatus having characteristic features of the present disclosure includes a surrounding information acquisition sensor (a travelling direction information detecting unit) 2, which functions as a detection device to obtain surrounding information for the travelling direction, so that autonomous travel is performed based on the surrounding information.

An autonomous travelling vehicle refers to an apparatus that autonomously travels by a machine or program without involving human decisions, such as an autonomous industrial transport vehicle for conveying target objects in a factory.

The autonomous travelling vehicle 1 according to the first embodiment includes the surrounding information acquisition sensor 2, a car body (apparatus body) 3, tires 5 used for running, and a bumper 7 functioning as a buffer.

The autonomous travelling vehicle 1 is a vehicle controlled to autonomously travel based on surrounding information. As shown in FIG. 2, the autonomous travelling vehicle 1 includes an information processing unit 11 that processes surrounding information obtained by the surrounding information acquisition sensor 2, a control unit 12 that controls the travel of the autonomous travelling vehicle 1 based on the surrounding information, and a storage (non-transitory computer-readable medium) 13 that stores the control program for controlling the travel of the autonomous travelling vehicle 1 and the obtained surrounding information from the surrounding information acquisition sensor 2.

The surrounding information acquisition sensor 2 is a laser-based sensor.

A laser-based sensor emits laser from a light emitter and detects light reflected on a surface of the target object at a light receiver, thereby determining the distance to the target object based on the length of time between when the light was emitted and when it was received.

The surrounding information acquisition sensor 2 is positioned in the front of the car body 3 of the autonomous travelling vehicle 1 as shown in FIG. 1. The surrounding information acquisition sensor 2 thus can obtain surrounding information in the travelling direction of the autonomous travelling vehicle 1. Reference character 2a denotes its detection area.

As shown in FIG. 3, the first embodiment further includes a tilt sensor 21, which functions as a detection device for detecting the attitude of the autonomous travelling vehicle 1. The tilt sensor 21 detects the attitude state of the autonomous travelling vehicle 1, for example, tilt information such as being inclined upward or downward, or being inclined to the right or left. This achieves more accurate recognition of surrounding information for the autonomous travelling vehicle 1.

Information collected by the surrounding information acquisition sensor 2 and the tilt sensor 21 are processed by the information processing unit 11.

The information processing unit 11 includes a recognition processing unit 111, an obstacle determining unit 112, and a route determining unit 113 as shown in FIG. 3.

The recognition processing unit 111 recognizes a position represented by surrounding information.

The obstacle determining unit 112 determines whether there is an obstacle or not ahead of the autonomous travelling vehicle 1 by recognizing surrounding information.

The route determining unit 113 determines a route to be taken by the autonomous travelling vehicle 1 in accordance with recognition of surrounding information by the recognition processing unit 111 and the presence or absence of an obstacle determined by the obstacle determining unit 112.

In the first embodiment, the information processing unit 11 also includes a blind area determining unit (an undetectable area determining unit) 114.

The blind area determining unit 114 determines a blind area (an undetectable area) around the car body 3 that is not covered by the surrounding information acquisition sensor 2 based on surrounding information obtained by the surrounding information acquisition sensor 2.

In the first embodiment, as depicted in FIG. 4, the detection area covered by the surrounding information acquisition sensor 2 in the horizontal direction may be a horizontal detection area 2*ah* defined by a predetermined angle θ1 in the horizontal direction forwardly in the travelling direction of the autonomous travelling vehicle 1. In this example, the angle θ1 in the horizontal direction may be set at 60°. The blind areas for the surrounding information acquisition sensor 2 in the horizontal direction may correspond to an area in front of the vehicle-width-direction edge of the vehicle on the forward side of the travelling direction of the autonomous travelling vehicle 1 excluding the horizontal detection area 2*ah* (blind areas D1*a*L and D1*a*R).

As shown in FIG. 4, for the blind areas D1*a*L (the left area) and D1*a*R (the right area), W1 represents the width of the edge in the vehicle width direction (the bumper 7 width), P1L and P1R represent points of intersection of forward extended lines from both ends of the edge and the horizontal detection area 2*ah* of the surrounding information acquisition sensor 2 respectively, W1L and W1R represent the sizes of the blind areas D1*a*L and D1*a*R in the vehicle width direction, respectively, and L1L and L1R represent the length of the blind areas D1*a*L and D1*a*R in the forward direction relative to the car body, respectively.

According to the first embodiment, the bumper 7 may be equipped with a pressure sensitive switch 15 that functions as a contact detection sensor to detect an object by contacting the object.

That is, the first embodiment may further include the pressure sensitive switch 15 in addition to the surrounding information acquisition sensor 2 and the tilt sensor 21 as detection devices.

In the first embodiment, the control unit 12 may determine that a detected object has collided with the bumper 7 via action of the pressure sensitive switch 15 and control the autonomous travelling vehicle 1 so as to stop travelling.

The structure of the bumper 7 will be now described with reference to FIG. 5.

As shown in FIG. 5, the bumper 7 includes an outer component 7*a*, an elastic member 7*b*, the pressure sensitive switch 15, and the like.

The outer component 7*a* is a rectangular element long in the vehicle width direction, provided on the outermost surface of the autonomous travelling vehicle 1. The outer component 7*a* is a rigid component made of material such as polycarbonate, HIPS, ABS, or PS. In case the autonomous travelling vehicle 1 collides with an obstacle, the outer component 7*a* would first contact the obstacle.

The elastic member 7*b* is made from elastic material and disposed on the inner side of the outer component 7*a* in contact with the outer component 7*a* and positioned between the car body 3 and the outer component 7*a*. For example, as shown in FIG. 5, the elastic member 7*b* is affixed to the inner surface of the outer component 7*a* on the car body 3 side. If an obstacle collides with the outer component 7*a*, the outer component 7*a* is pushed toward the car body, which in turn causes contraction of a portion of the elastic member 7*b* that is being pushed.

The elastic member 7*b* may be made of any material that has elasticity, such as urethane, silicone, NBR, and EPDM.

The elastic member 7*b* has a certain thickness in order to absorb shock at the time of collision, the value of the thickness (W) being appropriately determined by predefining how much pressing force it will absorb upon a collision and how much contraction will trigger the stop of the vehicle.

By way of example, when the thickness (W) of the elastic member 7*b* is 15 cm, assuming that the autonomous travelling vehicle 1 having a weight of 150 kg collides with an obstacle while it is travelling at a speed of 5 km/h, the autonomous travelling vehicle 1 can be stopped immediately before the thickness (W) of the elastic member 7*b* becomes almost zero due to absorption of shock by the elastic member 7*b*.

The bumper 7 is fixed to the car body 10 by an attachment component not illustrated.

The attachment component is rigid, and may be made of material such as stainless steel, iron, SUS, or aluminum, for example.

The pressure sensitive switch 15 serving as a contact detection sensor is mounted between the elastic member 7*b* and the car body 3. The pressure sensitive switch 15 detects that there has been a collision when the elastic member 7*b* starts contraction and pressing force greater than a specific value was applied to the pressure sensitive switch 15, and outputs a predetermined pressure signal (a collision detection signal). The pressure signal is sent to the control unit 12, which utilizes the pressure signal to carry out deceleration of the travelling speed of the car body 3, for example.

When a collision with an object (an obstacle) has been detected by the pressure sensitive switch 15, the control unit 12 performs processing for stopping the autonomous travelling vehicle 1 before the elastic member 7*b* completely contracts.

Optionally, an additional bumper including the outer component 7*a*, elastic member 7*b*, and multiple pressure sensitive switches 15 similarly to the front bumper 7 may be provided also in the rear of the car body 3.

A general processing procedure for controlling the driving of the autonomous travelling vehicle 1 in the first embodiment will be now described according to a flowchart.

Figure 6:
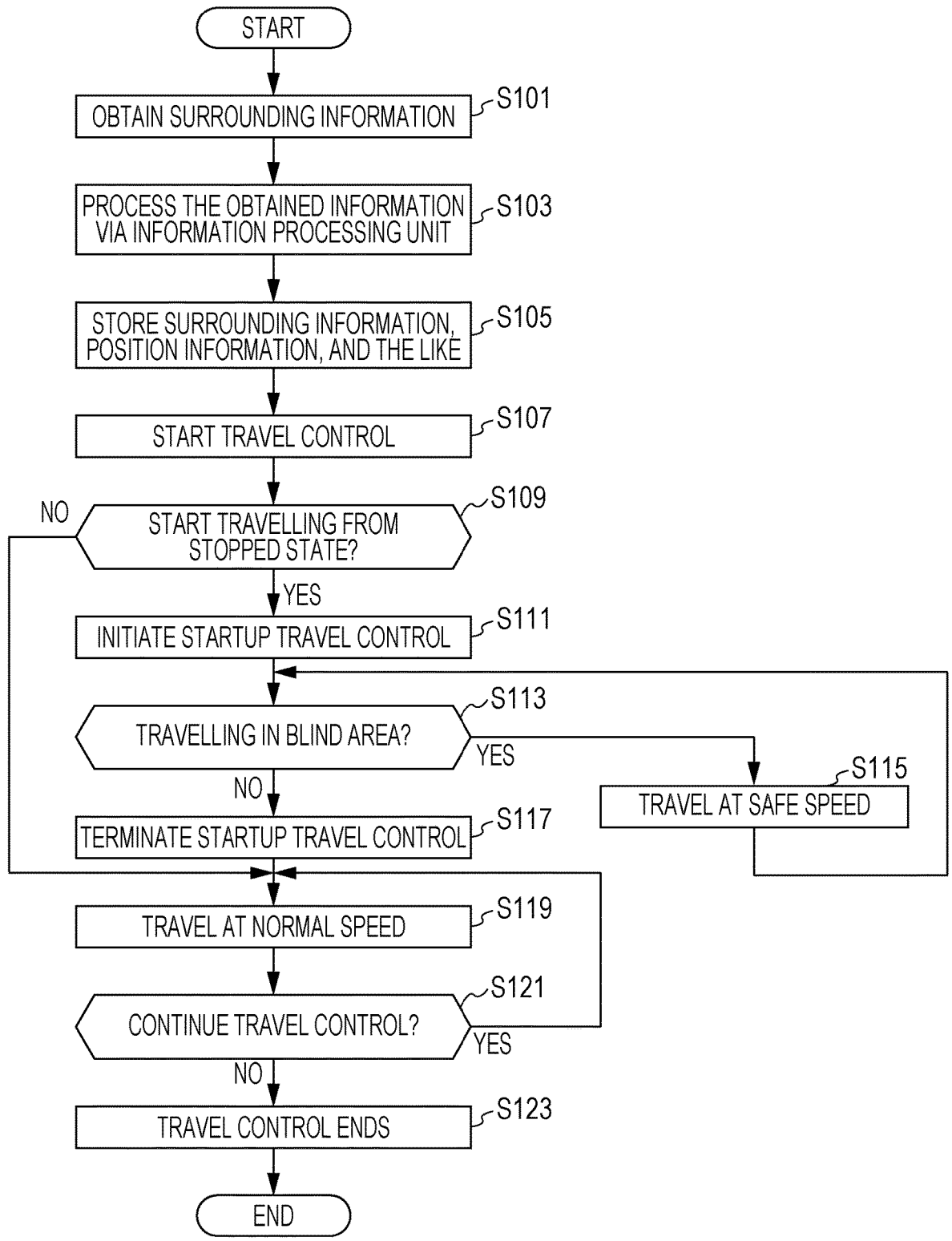
FIG. 6 is a flowchart illustrating a processing procedure for travel control of the autonomous travelling vehicle.

FIG. 6 is a flowchart illustrating the processing procedure for travel control of the autonomous travelling vehicle 1 in the first embodiment.

As shown in FIG. 6, when the driving of the autonomous travelling vehicle 1 is started, surrounding information and tilt information are obtained by the surrounding information acquisition sensor 2 and the tilt sensor 21 (step S101).

The surrounding information obtained by the surrounding information acquisition sensor 2 and the position information for the autonomous travelling vehicle 1 are sent to the information processing unit 11 in which they go through information processing involved for autonomous travel (step S103), to be stored in the storage 13 (step S105).

Then, based on the surrounding information, the control unit 12 starts travel control of the autonomous travelling vehicle 1 (step S107).

It is then determined whether the autonomous travelling vehicle 1 is to start travelling from a stopped state or not (step S109). If it is determined that the autonomous travelling vehicle 1 is to start travelling from a stopped state at step S109, startup travel control is executed (step S111).

The startup travel control will be now described.

In the first embodiment, the startup travel control controls the autonomous travelling vehicle 1 when it starts travel from a stopped state such that it travels at a predetermined safe speed lower than a preset normal travelling speed when the autonomous travelling vehicle 1 travels in a blind area around the car body, and at the normal travelling speed when it travels outside the blind area.

In the present description, the travelling speed of the autonomous travelling vehicle 1 during normal driving is set to about 5 km/h. The travelling speed during driving in a blind area is set to about 2.5 km/h as a safe speed corresponding to the buffering ability of the bumper 7 at the time of collision.

Of course, these values are only exemplary and the travelling speed of the autonomous travelling vehicle 1 may be set in accordance with the situation in which it is used.

After the startup travel control is started at step S111, it is determined whether the autonomous travelling vehicle 1 is travelling in a blind area around the car body or not (step S113).

If it is determined that the autonomous travelling vehicle 1 is travelling in a blind area at step S113, the autonomous travelling vehicle 1 is controlled so as to travel at a safe speed lower than the normal travelling speed (step S115).

On the other hand, if it is determined that the autonomous travelling vehicle 1 is not travelling in a blind area at step S113, the startup travel control is terminated (step S117) and the autonomous travelling vehicle 1 is controlled so as to travel at the normal travelling speed (step S119).

It is then determined whether to continue the travel control or not (step S121).

If it is determined that the travel control is to be continued at step S121, the flow returns to step S119, where the travel control at the normal speed is continued.

On the other hand, if it is determined that the travel control is not to be continued, the travel control ends (step S123).

In this manner, when starting to travel from a stopped state, the autonomous travelling vehicle 1 is controlled so that it travels at a lower safe speed if it travels in a blind area around the car body not covered by the surrounding information acquisition sensor 2. After passing the blind area, the autonomous travelling vehicle 1 can immediately travel at the normal speed.

Next, control of the travelling speed of the autonomous travelling vehicle 1 will be described with a timing diagram.

Figure 7:
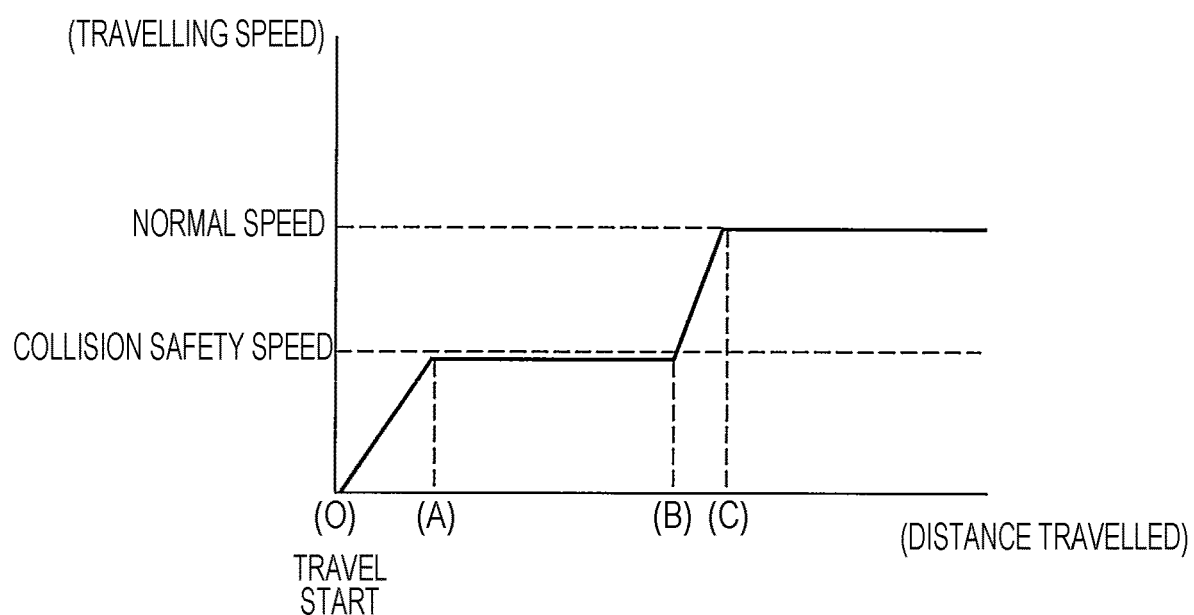
FIG. 7 is a timing diagram showing control modes for the travelling speed of the autonomous travelling vehicle.

FIG. 7 is a timing diagram showing control modes for the travelling speed of the autonomous travelling vehicle in the first embodiment.

As shown in FIG. 7, after starting travel, the autonomous travelling vehicle 1 is controlled so as to accelerate to a predetermined speed equal to or lower than a collision safety speed from the travel start point (location O) until it reaches location A, which is located at a predetermined distance from location O and falls within a blind area, and travel at that predetermined speed equal to or lower than the collision safety speed from location A to location B, which is located outside the blind areas of the surrounding information acquisition sensor 2. Then, it is controlled so as to accelerate to the normal speed from location B to location C located at a predetermined distance from location B, and at the normal speed from location C on.

In this manner, the autonomous travelling vehicle 1 is controlled so as to travel at a speed at or below the collision safety speed from startup until it has passed a blind area of the surrounding information acquisition sensor 2, and at the normal speed when travelling outside the blind area.

As described above, according to the first embodiment, the autonomous travelling vehicle 1 includes the surrounding information acquisition sensor 2 to obtain surrounding information for the travelling direction of the car body 3, the information processing unit 11 that processes the surrounding information obtained by the surrounding information acquisition sensor 2, the control unit 12 that controls driving of the autonomous travelling vehicle 1 based on the surrounding information, and the blind area determining unit 114 that determines a blind area around the car body that is not covered by the surrounding information acquisition sensor 2, where the autonomous travelling vehicle 1 is controlled so as to travel at a predetermined safe speed lower than a preset normal speed through startup travel control by the control unit 12 when it travels in the blind areas D1aL, D1aR for the surrounding information acquisition sensor 2 in plan view when it starts travelling. Thus, in case there is an obstacle in the blind area D1aL or D1aR, safety against collision can be assured without considerable damage to the autonomous travelling vehicle itself or the obstacle.

The first embodiment also improves safety at the time of collision by providing the bumper 7 as a buffer on the front side of the car body 3.

In addition, by providing the contact detection sensor 15 in the bumper 7, the first embodiment can instantaneously stop the travelling operation of the autonomous travelling vehicle 1 by the action of the contact detection sensor 15 in case a detected object collides with the bumper 7 in the blind area D1aL, D1aR. This can assure safety against collision with minimized damage to the autonomous travelling vehicle itself or the obstacle.

Second Embodiment

Now referring to FIG. 8, the second embodiment of the present disclosure will be described.

Figure 8:
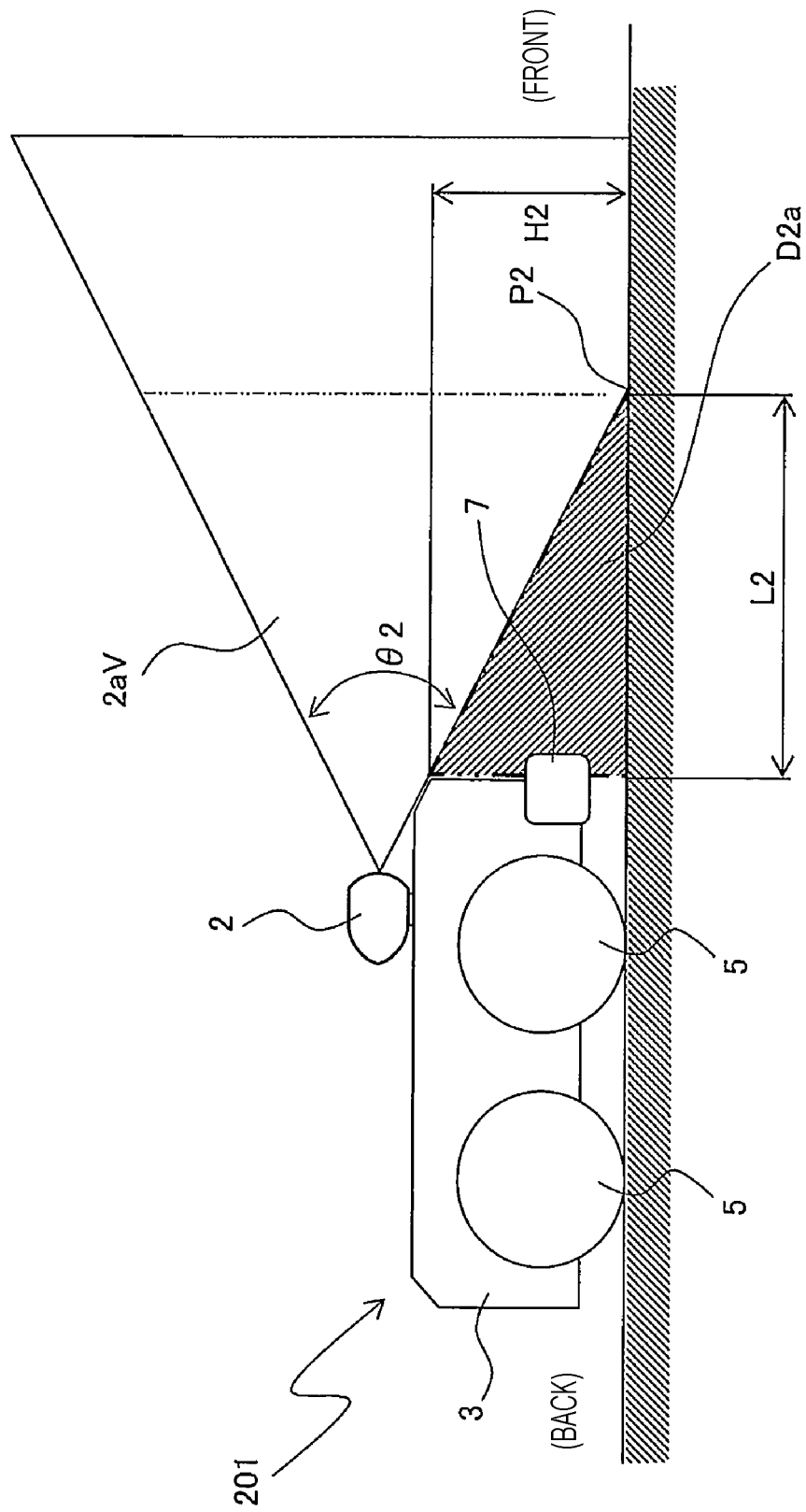
FIG. 8 is a side view illustration of the detection area and blind areas of the surrounding information acquisition sensor when the autonomous travelling vehicle according to a second embodiment of the present disclosure is on a flat road.

FIG. 8 is a side view illustration of the detection area and blind areas of the surrounding information acquisition sensor on a flat road for the autonomous travelling vehicle according to the second embodiment of the present disclosure.

Components of the autonomous travelling vehicle in the second embodiment that are similar to the counterparts of the first embodiment are denoted by the same reference characters and not described again.

As shown in FIG. 8, an autonomous travelling vehicle 201 according to the second embodiment includes a surrounding information acquisition sensor 2, a car body 3, tires 5 used for running, and a bumper 7 functioning as a buffer as with the first embodiment.

The second embodiment discusses blind areas that are not covered by the surrounding information acquisition sensor 2 when the autonomous travelling vehicle 201 runs on a flat road.

As shown in FIG. 8, for the autonomous travelling vehicle 201, the detection area of the surrounding information acquisition sensor 2 in the vertical direction may be a vertical detection area 2aV defined by a predetermined angle θ2 in the vertical direction forwardly in the travelling direction of the autonomous travelling vehicle 201. In this example, the angle θ2 in the vertical direction may be set to 50°. A blind area D2a for the surrounding information acquisition sensor 2 in the vertical direction may be an area in front of the autonomous travelling vehicle 201 excluding the vertical detection area 2aV.

More specifically, the blind area D2a is defined with P2 representing the point of intersection of the flat road and the vertical detection area 2aV of the surrounding information acquisition sensor 2, H2 representing the height of the blind area D2a on the car body side, and L2 representing the length of the blind area D2a in the forward direction relative to the car body, as shown in FIG. 8. In this example, the height H2 of the blind area D2a may be set to about 50 cm.

In the second embodiment, when the autonomous travelling vehicle 201 travels within the length L2 of blind area D2a in the forward direction relative to the car body, it is controlled so as to travel at a predetermined safe speed lower than a normal travelling speed prescribed by the startup travel control by the control unit 12 as in the first embodiment.

As described above, according to the second embodiment, when the autonomous travelling vehicle 201 travels in the blind area D2a not covered by the surrounding information acquisition sensor 2 in side view when it starts travelling, it is controlled so as to travel at a predetermined safe speed lower than a normal speed prescribed by the startup travel control by the control unit 12. Thus, in case there is an obstacle in the blind area D2a, safety against collision can be assured without considerable damage to the autonomous travelling vehicle itself or the obstacle.

The second embodiment also improves safety at the time of collision by providing the bumper 7 as a buffer on the front side of the car body 3 similarly to the first embodiment.

In addition, by providing the contact detection sensor 15 in the bumper 7, the second embodiment can also instantaneously stop the travelling operation of the autonomous travelling vehicle 201 by the action of the contact detection sensor 15 in case a detected object collides with the bumper 7 in the blind area D2a. This can assure safety against collision with minimized damage to the autonomous travelling vehicle itself or the obstacle.

Third Embodiment

Now referring to FIG. 9, the third embodiment of the present disclosure will be described.

Figure 9:
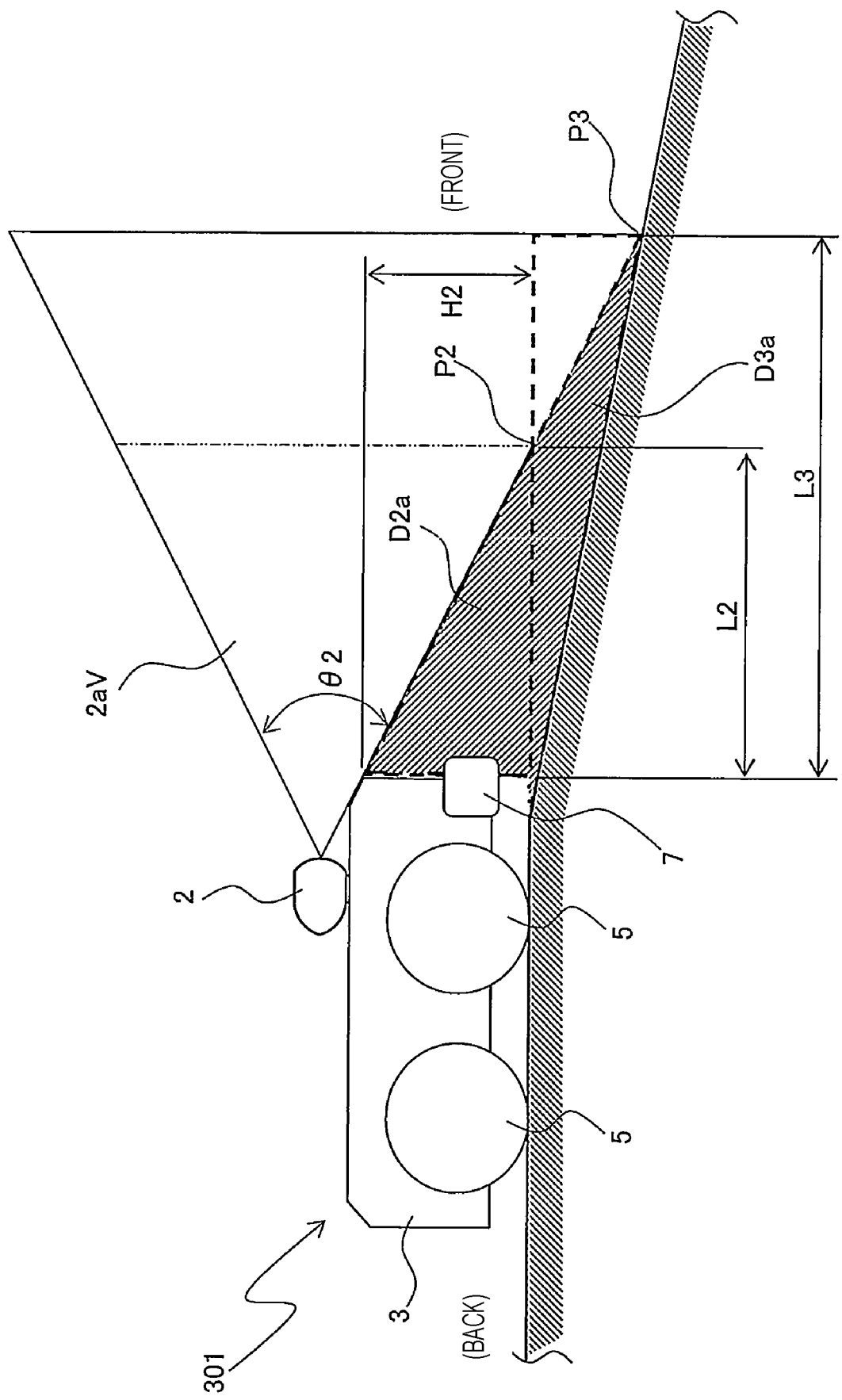
FIG. 9 is a side view illustration of the detection area and blind areas of the surrounding information acquisition sensor for the autonomous travelling vehicle according to a third embodiment of the present disclosure on a descending slope.

FIG. 9 is a side view illustration of the detection area and blind areas of the surrounding information acquisition sensor on a descending slope for the autonomous travelling vehicle according to the third embodiment of the present disclosure.

Components of the autonomous travelling vehicle in the third embodiment that are similar to the counterparts of the first embodiment are denoted by the same reference characters and not described again.

As shown in FIG. 9, an autonomous travelling vehicle 301 according to the third embodiment includes a surrounding information acquisition sensor 2, a car body 3, tires 5 used for running, and a bumper 7 functioning as a buffer as with the first embodiment.

The third embodiment discusses a blind area that is not covered by the surrounding information acquisition sensor 2 on a road having a descending slope ahead of the autonomous travelling vehicle 301.

For the autonomous travelling vehicle 301, as shown in FIG. 9, the detection area of the surrounding information acquisition sensor 2 in the vertical direction is a vertical detection area 2aV defined by a predetermined angle θ2 in the vertical direction forwardly in the travelling direction of the autonomous travelling vehicle 301. In this example, the angle θ2 in the vertical direction may be set to 50°. A blind area D3a for the surrounding information acquisition sensor 2 in the vertical direction is an area in front of the autonomous travelling vehicle 301 excluding the vertical detection area 2aV and including a space formed by the descending slope.

More specifically, as shown in FIG. 9, when L3 represents the length from the front edge of the autonomous travelling vehicle 301 to the point of intersection P3 of the descending slope and the vertical detection area 2aV of the surrounding information acquisition sensor 2, the blind area D3a is an area having a length L3 from the front of the autonomous travelling vehicle 301 to the point of intersection P3 excluding the vertical detection area 2aV of the surrounding information acquisition sensor 2.

That is, the blind area D3a includes an area equivalent to the blind area D2a (where P2 represents the point of intersection of a virtual line corresponding to a flat road and the vertical detection area 2aV of the surrounding information acquisition sensor 2, H2 represents the height of the blind area D2a on the car body side, and L2 represents its length in the forward direction relative to the car body) plus a space spanning the longer length L3 formed by the descending slope.

Accordingly, when there is a descending slope ahead of the autonomous travelling vehicle 301, the surrounding information acquisition sensor 2 covers a longer distance on the road for detection than when the road is flat. Given this fact, the third embodiment makes settings so that the autonomous travelling vehicle 301 travels at a safe speed for a longer time under the startup travel control by the control unit 12.

Figure 10:
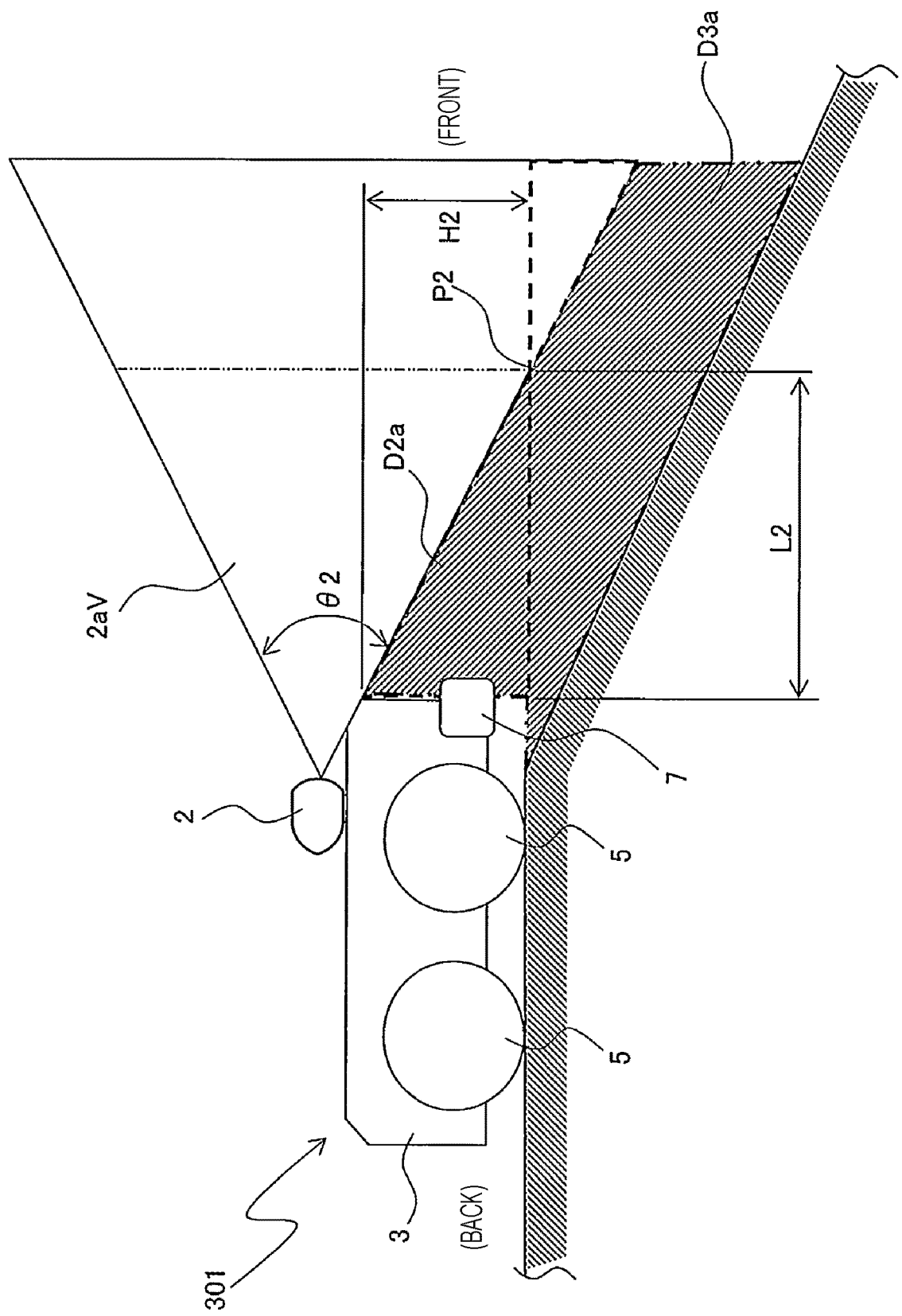
FIG. 10 illustrates a variation of the detection area and blind areas of the surrounding information acquisition sensor for the autonomous travelling vehicle on a descending slope.

When a slope ahead of the autonomous travelling vehicle 301 is a steep slope exceeding the angle θ2 of detection by the surrounding information acquisition sensor 2 as depicted in FIG. 10, the road may not be detected by the surrounding information acquisition sensor 2. Thus, the autonomous travelling vehicle 301 may be controlled so that it travels at a safe speed from when it enters the slope until the road is detected by the surrounding information acquisition sensor 2 and travels under startup travel control by the control unit 12 from the point when the road has been detected.

As described above, according to the third embodiment, when there is a blind area D3a formed by a descending slope ahead of the autonomous travelling vehicle 301 at the start of travel, the autonomous travelling vehicle 301 is made to travel at a predetermined safe speed lower than a preset normal speed under the startup travel control by the control unit 12. This can assure safety against collision without considerable damage to the autonomous travelling vehicle itself or the obstacle even if an obstacle is present in the blind area D3a.

The third embodiment also improves safety at the time of collision by providing the bumper 7 as a buffer on the front side of the car body 3 similarly to the first embodiment.

In addition, by providing the contact detection sensor 15 in the bumper 7, the third embodiment can also instantaneously stop the travelling operation of the autonomous travelling vehicle 301 by the action of the contact detection sensor 15 in case a detected object collides with the bumper 7 in the blind area D2a. This can assure safety against collision with minimized damage to the autonomous travelling vehicle itself or the obstacle.

Fourth Embodiment

Now referring to FIG. 11, the fourth embodiment of the present disclosure will be described.

Figure 11:
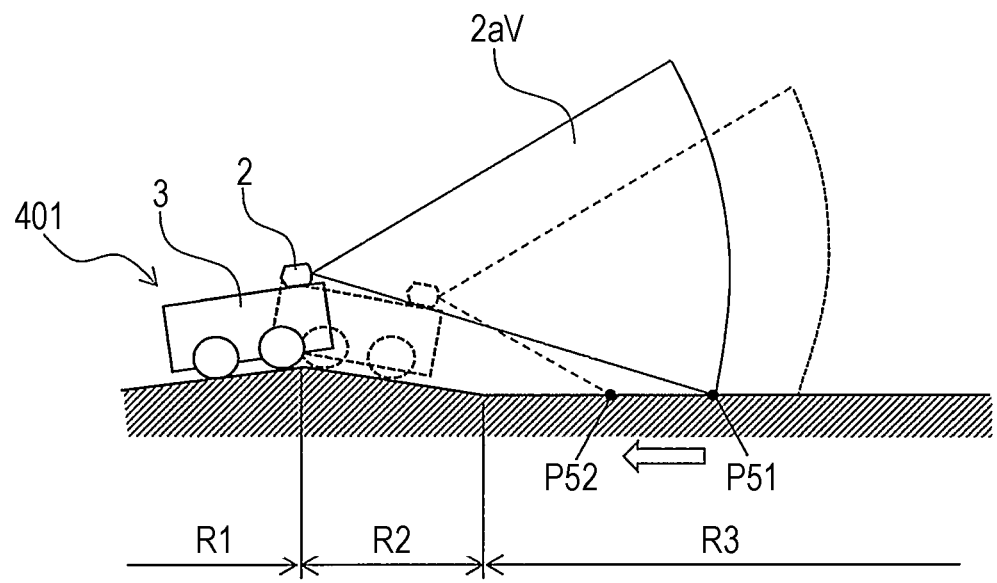
FIG. 11 is a side view illustration of the conditions of the detection area and blind area of the surrounding information acquisition sensor when the autonomous travelling vehicle according to a fourth embodiment of the present disclosure travels on an ascending slope and then on a descending slope.

FIG. 11 is a side view illustration of the conditions of the detection area and blind area of the surrounding information acquisition sensor when there is change in the inclination condition of the road on which the autonomous travelling vehicle according to the fourth embodiment of the present disclosure travels.

Components of the autonomous travelling vehicle in the fourth embodiment that are similar to the counterparts of the first embodiment are denoted by the same reference characters and not described again.

As shown in FIG. 11, an autonomous travelling vehicle 401 according to the fourth embodiment has the surrounding information acquisition sensor 2 mounted on the car body 3 as with the first embodiment. The surrounding information acquisition sensor 2 obtains surrounding information ahead of the autonomous travelling vehicle 401 in accordance with the inclination condition of the road on which the autonomous travelling vehicle 401 travels at the time of startup, so that a blind area ahead of the autonomous travelling vehicle 401 is determined and autonomous travelling is performed accordingly.

In the fourth embodiment, it is assumed that the autonomous travelling vehicle 401 travels on a road that changes from an ascending slope R1 to a descending slope R2, then to a flat road R3 as shown in FIG. 11.

At the startup of the autonomous travelling vehicle 401, the autonomous travelling vehicle 401 is on the ascending slope R1, where the position on the road detected by the surrounding information acquisition sensor 2 at the startup is the point of intersection (point P51) of the flat road R3 located ahead and the vertical detection area 2aV of the surrounding information acquisition sensor 2.

That is, the front blind area for the autonomous travelling vehicle 401 on the ascending slope R1 is the range from the front edge of the car body 3 to point P51.

Then, while the autonomous travelling vehicle 401 is travelling on the descending slope R2 after starting to travel and passing through the ascending slope R1, the position on the road detected by the surrounding information acquisition sensor 2 is the point of intersection (point P52) of the flat road R3 located ahead and the vertical detection area 2aV of the surrounding information acquisition sensor 2.

That is, the front blind area for the autonomous travelling vehicle 401 on the descending slope R2 is the range from the front edge of the car body 3 to point P52.

In this situation, since the surrounding information acquisition sensor 2 of the autonomous travelling vehicle 401 is inclined downward, the point P52 detected by the surrounding information acquisition sensor 2 is closer to the autonomous travelling vehicle 401 than the point P51 is.

In the fourth embodiment, when the position on the road detected by the surrounding information acquisition sensor 2 (point P52) changes to a position closer to the autonomous travelling vehicle 401 than the position detected by the surrounding information acquisition sensor 2 at the startup of the autonomous travelling vehicle 401 (point P51) due to the inclination condition of the road on which the autonomous travelling vehicle 401 travels, the blind area for the surrounding information acquisition sensor 2 in the vertical direction becomes shorter in the front-back direction. Accordingly, the information processing unit 11 may be configured to determine the undetectable area up to the point P52 at a shorter distance is a new undetectable area.

As described above, according to the fourth embodiment, when the blind area for the surrounding information acquisition sensor 2 in the vertical direction becomes shorter in the front-back direction due to the inclination condition of the road on which the autonomous travelling vehicle 401 travels, the information processing unit 11 determines the blind area having the shorter length as a new blind area so that the distance travelled at a speed lower than the collision safety speed is decreased, enabling efficient control of the travelling speed.

Fifth Embodiment

Now referring to FIG. 12, the fifth embodiment of the present disclosure will be described.

Figure 12:
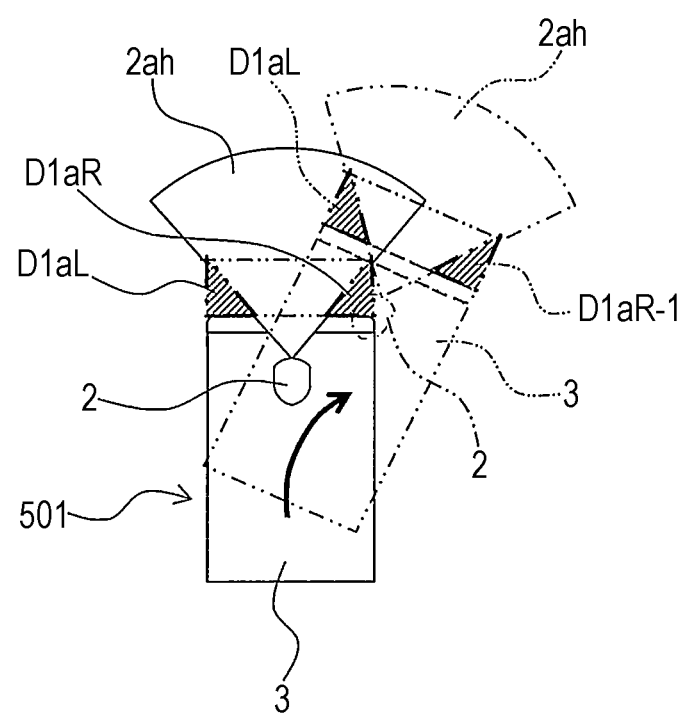
FIG. 12 illustrates the detection area and blind areas of the surrounding information acquisition sensor when the autonomous travelling vehicle according to a fifth embodiment of the present disclosure makes a turn.

FIG. 12 is a side view illustration of the detection area and blind areas of the surrounding information acquisition sensor when the autonomous travelling vehicle according to the fifth embodiment of the present disclosure makes a turn.

Components of the autonomous travelling vehicle in the fifth embodiment that are similar to the counterparts of the first embodiment are denoted by the same reference characters and not described again.

As shown in FIG. 12, an autonomous travelling vehicle 501 according to the fifth embodiment has the surrounding information acquisition sensor 2 mounted on the car body 3 as with the first embodiment. The surrounding information acquisition sensor 2 obtains surrounding information ahead of the autonomous travelling vehicle 501 in accordance with a turning action when the autonomous travelling vehicle 501 makes a turning action at the startup, so that a blind area ahead of the autonomous travelling vehicle 501 is determined and autonomous travel is performed accordingly.

In the fifth embodiment, when the autonomous travelling vehicle 501 makes a turning action to the right (in the direction indicated by the arrow) as depicted in FIG. 12, the blind area D1aL for the surrounding information acquisition sensor 2 in front of the car body 3 on the left side changes its position by turning forward to the right as if following the horizontal detection area 2ah of the surrounding information acquisition sensor 2. Thus, the blind area D1aL comes to be included in the horizontal detection area 2ah as the turning action of the car body 3 proceeds.

The blind area D1aR for the surrounding information acquisition sensor 2 on the right side in front of the car body 3, on the other hand, moves to a position not included in the horizontal detection area 2ah ahead of the car body 3 on the right side as the turning action of the car body 3 proceeds because the blind area D1aR is positioned on the right side of the horizontal detection area 2ah of the surrounding information acquisition sensor 2. This creates another blind area D1aR-1 in front of the car body 3 on the right side.

In the fifth embodiment, when the autonomous travelling vehicle 501 starts a turning action and the positions of the blind areas for the surrounding information acquisition sensor 2 in the horizontal direction change, the blind area D1aR-1 is present which is not included in the horizontal detection area 2ah of the surrounding information acquisition sensor 2 on the forward side in the turning direction of the autonomous travelling vehicle 501. Thus, the information processing unit 11 may be configured to determine the blind area D1aR-1 not included in the horizontal detection area 2ah is a new blind area.

Although not shown, when the autonomous travelling vehicle 501 makes a turning action to the left, the blind area D1aR of the surrounding information acquisition sensor 2 on the right side ahead of the car body 3 comes to be included in the horizontal detection area 2ah as the turning action of the car body 3 proceeds; whereas the blind area D1aL of the surrounding information acquisition sensor 2 on the left side ahead of the car body 3 moves to a position not included in the horizontal detection area 2ah on the left side in front of the car body 3 as the turning action of the car body 3 proceeds. As another blind area is present on the left side ahead of the car body 3, the information processing unit 11 may determine that the blind area not included in the horizontal detection area 2ah is a new blind area.

As described above, according to the fifth embodiment, if the positions of the blind areas for the surrounding information acquisition sensor 2 in the horizontal direction change when the autonomous travelling vehicle 501 makes a turning action at the startup, the information processing unit 11 determines that a blind area not included in the horizontal detection area 2ah of the surrounding information acquisition sensor 2 on the forward side in the turning direction of the autonomous travelling vehicle 501 is a new blind area, thereby enabling safer travel control of the autonomous travelling vehicle 501.

The foregoing embodiments employ a laser-based sensor for obtaining position information or a CCD-based sensor for obtaining image information as a detection device for detecting surrounding information for the autonomous travelling vehicle; however, they are not limitative and the detection device may instead be, for example, an ultrasonic sensor that measures the distance to a target object by emitting an ultrasonic wave and detecting an acoustic wave reflected on the surface of the target object at a receiving unit.

Although the foregoing embodiments are described for a case of travelling in a blind area of the surrounding information acquisition sensor 2 installed in the front of the autonomous travelling vehicle, those embodiment are also applicable to travel in a blind area of a surrounding information acquisition sensor 2 installed in the rear of the autonomous travelling vehicle.

Although the foregoing embodiments are described by illustrating application of an autonomous travelling apparatus to an autonomous travelling vehicle functioning as a security patrol robot, they may be applied to other kinds of autonomous travelling apparatus of course, such as an automated transport apparatus, unmanned cruising vehicle, unmanned delivery robot, driverless agricultural machine.

The present disclosure contains subject matter related to that disclosed in Japanese Priority Patent Application JP 2016-155830 filed in the Japan Patent Office on Aug. 8, 2016, the entire contents of which are hereby incorporated by reference.

The present disclosure is not limited to the embodiments described above and may be embodied with various modifications within the scope disclosed in the appended claims. That is, embodiments obtained by combination of technical measures modified appropriately within the scope disclosed in the appended claims are also encompassed by the technical scope of the present disclosure.

The present disclosure is not limited to the embodiments described above and may be embodied with various modifications within the scope disclosed in the appended claims. That is, embodiments obtained by combination of technical measures modified appropriately without departing from the purport of the present disclosure are also encompassed by the technical scope of the present disclosure.

What is claimed is:

1. An autonomous travelling apparatus having a detection device to obtain surrounding information and autonomously travelling based on the surrounding information, the autonomous travelling apparatus comprising:
    an information processing unit that processes surrounding information obtained by the detection device;
    a control unit that controls driving of the autonomous travelling apparatus based on the surrounding information;
    a travelling direction information detecting unit that functions as the detection device to obtain surrounding information for a travelling direction; and
    an undetectable area determining unit that determines an undetectable area not covered by the travelling direction information detecting unit at a start of travel,
    an apparatus position determining unit that determines whether a position of the autonomous travelling apparatus is in the undetectable area or not, wherein
    when the position of the autonomous travelling apparatus is in the undetectable area, the control unit controls the autonomous travelling apparatus so as to travel at a predetermined speed lower than a preset normal speed.

2. The autonomous travelling apparatus according to claim 1, wherein the predetermined speed lower than the preset normal speed is equal to or below a collision safety speed for humans.

3. The autonomous travelling apparatus according to claim 2, wherein
    a contact detecting unit that detects an object by contacting the object is provided in an edge of the autonomous travelling apparatus on a side of the undetectable area, and
    the control unit stops the autonomous travelling apparatus when the object has been detected by the contact detecting unit.

4. The autonomous travelling apparatus according to claim 2, wherein
    a detection area in a horizontal direction covered by the travelling direction information detecting unit comprises a horizontal detection area defined by a predetermined angle in horizontal direction forwardly in the travelling direction of the autonomous travelling apparatus, and
    an undetectable area in the horizontal direction not covered by the travelling direction information detecting unit comprises an area in front of a width-direction edge on a forward side of the travelling direction of the autonomous travelling apparatus excluding the horizontal detection area.

5. The autonomous travelling apparatus according to claim 2, wherein
    a detection area in a vertical direction covered by the travelling direction information detecting unit comprises a vertical detection area defined by a predetermined angle in vertical direction forwardly in the travelling direction of the autonomous travelling apparatus, and
    an undetectable area in the vertical direction not covered by the travelling direction information detecting unit comprises an area in front of an edge on a forward side of the travelling direction of the autonomous travelling apparatus excluding the vertical detection area.

6. The autonomous travelling apparatus according to claim 2, wherein when an angle of inclination of the road ahead of the autonomous travelling apparatus exceeds an angle of detection in the vertical direction covered by the travelling direction information detecting unit, the control unit controls the autonomous travelling apparatus so as to travel at the predetermined speed lower than the preset normal speed until the road is detected by the travelling direction information detecting unit.

7. The autonomous travelling apparatus according to claim 1, wherein the predetermined speed lower than the preset normal speed is equal to or below a collision safety speed for an apparatus body.

8. The autonomous travelling apparatus according to claim 7, wherein
    a contact detecting unit that detects an object by contacting the object is provided in an edge of the autonomous travelling apparatus on a side of the undetectable area, and the control unit stops the autonomous travelling apparatus when the object has been detected by the contact detecting unit.

9. The autonomous travelling apparatus according to claim 7, wherein
a detection area in a horizontal direction covered by the travelling direction information detecting unit comprises a horizontal detection area defined by a predetermined angle in horizontal direction forwardly in the travelling direction of the autonomous travelling apparatus, and
an undetectable area in the horizontal direction not covered by the travelling direction information detecting unit comprises an area in front of a width-direction edge on a forward side of the travelling direction of the autonomous travelling apparatus excluding the horizontal detection area.

10. The autonomous travelling apparatus according to claim 7, wherein
a detection area in a vertical direction covered by the travelling direction information detecting unit comprises a vertical detection area defined by a predetermined angle in vertical direction forwardly in the travelling direction of the autonomous travelling apparatus, and
an undetectable area in the vertical direction not covered by the travelling direction information detecting unit comprises an area in front of an edge on a forward side of the travelling direction of the autonomous travelling apparatus excluding the vertical detection area.

11. The autonomous travelling apparatus according to claim 7, wherein when an angle of inclination of the road ahead of the autonomous travelling apparatus exceeds an angle of detection in the vertical direction covered by the travelling direction information detecting unit, the control unit controls the autonomous travelling apparatus so as to travel at the predetermined speed lower than the preset normal speed until the road is detected by the travelling direction information detecting unit.

12. The autonomous travelling apparatus according to claim 1, wherein
a contact detecting unit that detects an object by contacting the object is provided in an edge of the autonomous travelling apparatus on a side of the undetectable area, and
the control unit stops the autonomous travelling apparatus when the object has been detected by the contact detecting unit.

13. The autonomous travelling apparatus according to claim 1, wherein
a detection area in a horizontal direction covered by the travelling direction information detecting unit comprises a horizontal detection area defined by a predetermined angle in horizontal direction forwardly in the travelling direction of the autonomous travelling apparatus, and
an undetectable area in the horizontal direction not covered by the travelling direction information detecting unit comprises an area in front of a width-direction edge on a forward side of the travelling direction of the autonomous travelling apparatus excluding the horizontal detection area.

14. The autonomous travelling apparatus according to claim 13, wherein when the autonomous travelling apparatus starts a turning action and a position of the undetectable area in the horizontal direction not covered by the travelling direction information detecting unit changes, the information processing unit determines that an undetectable area not included in the detection area in the horizontal direction covered by the travelling direction information detecting unit on a forward side in a turning direction of the autonomous travelling apparatus is a new undetectable area.

15. The autonomous travelling apparatus according to claim 1, wherein
a detection area in a vertical direction covered by the travelling direction information detecting unit comprises a vertical detection area defined by a predetermined angle in vertical direction forwardly in the travelling direction of the autonomous travelling apparatus, and
an undetectable area in the vertical direction not covered by the travelling direction information detecting unit comprises an area in front of an edge on a forward side of the travelling direction of the autonomous travelling apparatus excluding the vertical detection area.

16. The autonomous travelling apparatus according to claim 15, wherein when the undetectable area in the vertical direction not covered by the travelling direction information detecting unit has become shorter in a front-back direction due to an inclination condition of a road on which the autonomous travelling apparatus travels, the information processing unit determines that the shorter undetectable area is a new undetectable area.

17. The autonomous travelling apparatus according to claim 1, wherein when an angle of inclination of the road ahead of the autonomous travelling apparatus exceeds an angle of detection in the vertical direction covered by the travelling direction information detecting unit, the control unit controls the autonomous travelling apparatus so as to travel at the predetermined speed lower than the preset normal speed until the road is detected by the travelling direction information detecting unit.

18. An autonomous travel control method for use with an autonomous travelling apparatus having a detection device to obtain surrounding information and autonomously travelling based on the surrounding information, the autonomous travel control method comprising:
obtaining surrounding information for a travelling direction;
processing the surrounding information obtained;
controlling driving of the autonomous travelling apparatus based on the surrounding information;
determining an undetectable area in which surrounding information is not obtained at a start of travel of the autonomous travelling apparatus; and
determining whether a position of the autonomous travelling apparatus is in the undetectable area or not, wherein
when the position of the autonomous travelling apparatus is in the undetectable area at a start of travel, the autonomous travelling apparatus is controlled so as to travel at a predetermined speed lower than a preset normal speed.

19. A non-transitory computer-readable medium storing a control program causing operation of an autonomous travelling apparatus having a detection device to obtain surrounding information, an information processing unit to process the surrounding information obtained, and a control unit to control driving and autonomously travelling based on the surrounding information, the control program causing:
the detection device to function to obtain surrounding information for a travelling direction;

the information processing unit to function to determine an undetectable area which is not covered by the detection device at a start of travel of the autonomous travelling apparatus;

an apparatus position determining unit that determines whether a position of the autonomous travelling apparatus is in the undetectable area or not; and the control unit to function to control the autonomous travelling apparatus so as to travel at a predetermined speed lower than a preset normal speed when the position of the autonomous travelling apparatus is in the undetectable area.

* * * * *